United States Patent
Sasaki et al.

(10) Patent No.: US 7,035,021 B2
(45) Date of Patent: Apr. 25, 2006

(54) LENS APPARATUS

(75) Inventors: Tadashi Sasaki, Saitama (JP); Hiroshi Mizumura, Saitama (JP); Atsushi Kanayama, Saitama (JP)

(73) Assignee: Fuji Photo Optical Co., Ltd., Saitama (JP)

(*) Notice: Subject to any disclaimer, the term of this patent is extended or adjusted under 35 U.S.C. 154(b) by 0 days.

(21) Appl. No.: 10/770,577

(22) Filed: Feb. 4, 2004

(65) Prior Publication Data

US 2004/0165078 A1     Aug. 26, 2004

(30) Foreign Application Priority Data

Feb. 5, 2003   (JP)   ............................... 2003-027871

(51) Int. Cl.
   *G02B 15/14*   (2006.01)
   *G03B 17/00*   (2006.01)

(52) U.S. Cl. ........................................ 359/701; 396/529

(58) Field of Classification Search ................ 359/701; 348/222.1, 231.3, 360; 396/303, 529–533
See application file for complete search history.

(56) References Cited

U.S. PATENT DOCUMENTS

| | | | | |
|---|---|---|---|---|
| 4,945,376 A | * | 7/1990 | Kawasaki et al. | 396/93 |
| 5,223,877 A | * | 6/1993 | Kawasaki et al. | 396/87 |
| 5,333,030 A | * | 7/1994 | Kikukawa et al. | 396/303 |
| 5,713,052 A | * | 1/1998 | Kawasaki et al. | 396/91 |
| 5,781,818 A | * | 7/1998 | Kobayashi | 396/529 |
| 6,717,618 B1 | * | 4/2004 | Yoshikawa | 348/360 |
| 6,734,912 B1 | * | 5/2004 | Kanayama et al. | 348/361 |
| 2002/0114625 A1 | * | 8/2002 | Uenaka et al. | 396/303 |
| 2003/0025805 A1 | * | 2/2003 | Yamagishi | 348/222.1 |

FOREIGN PATENT DOCUMENTS

| | | |
|---|---|---|
| JP | 11-14886 A | 1/1999 |
| JP | 3332808 B2 | 7/2002 |

* cited by examiner

*Primary Examiner*—Scott J. Sugarman
*Assistant Examiner*—M. Hasan
(74) *Attorney, Agent, or Firm*—Birch Stewart Kolasch & Birch LLP

(57) ABSTRACT

A selection device which permits or prohibits serial communication is provided in a lens apparatus capable of performing serial communication to suppress the serial communication although a camera body can perform the serial communication. Thus, a safe operation of the system can be guaranteed. At the same time, the processing speed of the processing circuit in the lens apparatus can be reduced, thereby successfully reducing the power consumption.

2 Claims, 2 Drawing Sheets

LENS APPARATUS

This Nonprovisional application claims priority under 35 U.S.C. § 119(a) on Patent Application No(s). 2003-027871 filed in JAPAN on Feb. 5, 2003, the entire contents of which are hereby incorporated by reference.

BACKGROUND OF THE INVENTION

1. Field of the Invention

The present invention relates to a lens apparatus, and more specifically to a lens apparatus capable of performing serial communication with a camera body.

2. Description of the Related Art

A lens apparatus loaded into a camera body of a television camera is normally provided with a parallel interface as a standard device so that various signals can be communicated between the camera body and the lens apparatus through the parallel interface. For example, a signal to be transmitted from the camera body to the lens apparatus can be a focus control signal for use in an autofocus operation, an iris control signal for use in an auto-iris operation. A signal to be transmitted from the lens apparatus to the camera body can be position information, etc. such as focus, zoom, iris, etc.

In the parallel interface, a predetermined type of signal is assigned as a transmission signal to each connector pin. Therefore, with greater variations of signals to be communicated between the camera body and the lens apparatus, the number of connector pins increases correspondingly. Practically, with increasing functions of a lens apparatus, the number of types of signals to be communicated between the camera body and the lens apparatus also increases. However, since the number of pins is limited, there have conventionally been a camera body and a lens apparatus capable of communicating various signals in serial communications (for example, Japanese Patent No. 3332808).

A camera body or a lens apparatus capable of performing serial communication is normally provided with a parallel interface in light of compatibility, and has the function of automatically switching between the serial communication and the parallel communication depending on whether the party is a serial communicative apparatus or not. Thus, when both camera body and lens apparatus can perform the serial communication, a signal is communicated in the serial communication. When one of them cannot perform the serial communication, the parallel communication can replace the serial communication for signals.

However, although both camera body and lens apparatus can perform serial communication, there can be a case in which no serial communication is required when the number of functions to be used is not so large. In fact, unnecessary information can bother a user when performing the serial communication, and cause trouble to an operation. Furthermore, when a large amount of information is communicated in the serial communication, a heavy load is put on a processing circuit (mainly the CPU) in the lens apparatus, which possibly reduces the throughput of the processes other than the communications. To compensate for this, the processing speed has to be enhanced with a high-speed clock, thereby requiring high power consumption.

SUMMARY OF THE INVENTION

The present invention has been developed to solve the above-mentioned problems, and aims at providing a lens apparatus capable of guaranteeing secure operation and reducing power consumption by communicating various signals in the parallel communication although the serial communication can be performed by a camera body and a lens apparatus.

To attain the above-mentioned purpose, according to the first aspect of the present invention, a lens apparatus capable of performing serial communication with a camera body includes a selection device which permits or prohibits the serial communication.

According to the second aspect of the present invention, when the serial communication is prohibited by the selection device, parallel communication is performed with a camera body.

Additionally, according to the third aspect of the present invention, when the serial communication is prohibited by the selection device, the processing speed of a processing circuit loaded into the lens apparatus can be reduced.

According to the present invention, a selection device for permitting or prohibiting serial communication is provided to suppress the serial communication although it can be performed. Therefore, a safe operation of the system can be guaranteed. At this time, the processing speed of the processing circuit in the lens apparatus can be reduced, thereby successfully reducing the power consumption.

DETAILED DESCRIPTION OF THE PREFERRED EMBODIMENTS

The preferred embodiments of the lens apparatus according to the present invention are described below by referring to the attached drawings.

Figure 1:
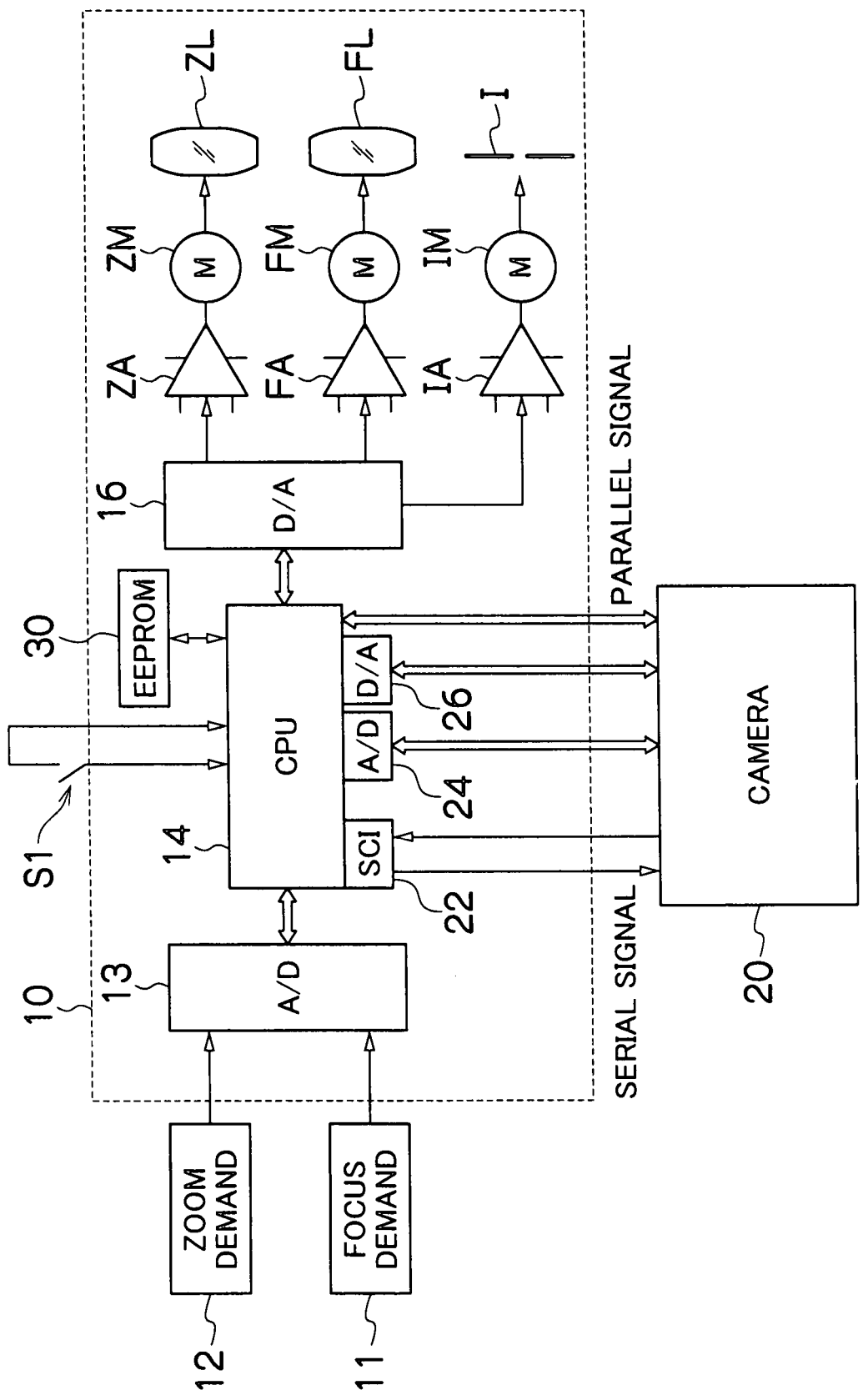
FIG. 1 shows the configuration of the lens apparatus according to the present invention.

FIG. 1 is a block diagram of the entire configuration of the lens apparatus according to the present invention. In FIG. 1, a focus lens (group) FL, a zoom lens (group) ZL, and an iris I are shown as movable optical members forming an optical system (taking lens) of a lens apparatus 10. Each of them can be driven by motors FM, ZM, and IM. For each of the motors FM, ZM, and IM, amplifiers FA, ZA, and IA are respectively provided. The amplifiers FA, ZA, and IA respectively drive the motors FM, ZM, and IM according to the control signal received through a D/A converter 16 from a CPU (central processing unit) 14 loaded into the lens apparatus 10. Thus, the positions or the operation speeds of the focus lens FL, the zoom lens ZL, and the iris I can be controlled by the control signal from the CPU 14. Using a potentiometer not shown in the attached drawings, the position information about the focus lens FL, the zoom lens ZL, and the iris I is transmitted to the CPU 14 for use in controlling the focus lens FL, zoom lens ZL, and the iris I.

Furthermore, a focus demand 11 and a zoom demand 12 having, for example, operation members which can be manually operated are connected to the lens apparatus 10. A command signal of a voltage corresponding to the set positions of their operation members is provided for the CPU 14 through an A/D converter 13. For display, the CPU 14 controls the position of the focus lens FL based on the voltage value of the command signal provided from the focus demand 11, and controls the operation speed of the zoom lens ZL based on the voltage value of the command signal provided from the zoom demand 12. Thus, according to the operations by the focus demand 11 and the zoom demand 12, the focus lens FL and the zoom lens ZL can be driven. The iris I is normally controlled according to the command signal provided from a camera body 20 by the following communication facility.

The lens apparatus 10 has a communication facility for communicating various signals (information) with an implemented camera body 20. The communication facility includes the function of performing serial communication (serial interface) for serially transmitting various signals, and the function of performing parallel communication (parallel interface) for parallel transmission of various signals. When the serial communication is performed with the camera body 20, various signals are communicated by serial transmission with the camera body 20 through an SCI (serial communication interface) 22. On the other hand, when the parallel communication is performed with the camera body 20, various signals (analog signals) from the camera body 20 in the parallel transmission are converted into digital signals by an A/D converter 24, and various signals such as ON/OFF signals, etc. transmitted to the camera body 20 in parallel for communications with the camera body 20 are converted into analog signals by a D/A converter 26 and output.

The information communicated in the above-mentioned serial communication and the parallel communication can be, for example, the position information, etc. about the focus lens FL, the zoom lens ZL, and the iris I from the lens apparatus 10 to the camera body 20, and the focus control signal for use in an autofocus operation, the iris control signal for use in an auto-iris operation, etc. from the camera body 20 to the lens apparatus 10. In the serial communication, a larger amount of information can be communicated between the lens apparatus 10 and the camera body 20 than in the parallel communication.

Furthermore, the lens apparatus 10 is provided with a serial prohibition switch S1 to be turned on/off by an operator. The on/off state of the switch S1 is detected by the CPU 14. When the operator turns off the serial prohibition switch S1, the serial communication is permitted. When the operator turns on the serial prohibition switch S1, the serial communication is prohibited.

If the serial prohibition switch S1 is turned off and the serial communication is permitted, and the camera body 20 has the function of performing the serial communication (serial interface), then the CPU 14 puts the communications mode with the camera body 20 in the serial communication mode to perform the serial communication for communication of various signals with the camera body 20. On the other hand, if the camera body 20 has no serial interface, then, as in the case in which the serial prohibition switch S1 is turned on, the communications mode with the camera body 20 is put in the serial communication prohibition mode.

If the serial prohibition switch S1 is turned on and the serial communication is prohibited, the CPU 14 enters the serial communication prohibition mode in which no serial communication is performed although the camera body 20 itself has a serial interface. In the serial communication prohibition mode, the communications of various signals with the camera body 20 are performed in the parallel communication if the camera body 20 has the function of the parallel communication (parallel interface). On the other hand, unless the camera body 20 has a parallel interface, no communications are performed with the camera body 20. In most cases, the camera body 20 is provided with a parallel interface as a standard device, and a signal is normally communicated in the parallel communication in the serial communication prohibition mode.

Figure 2:
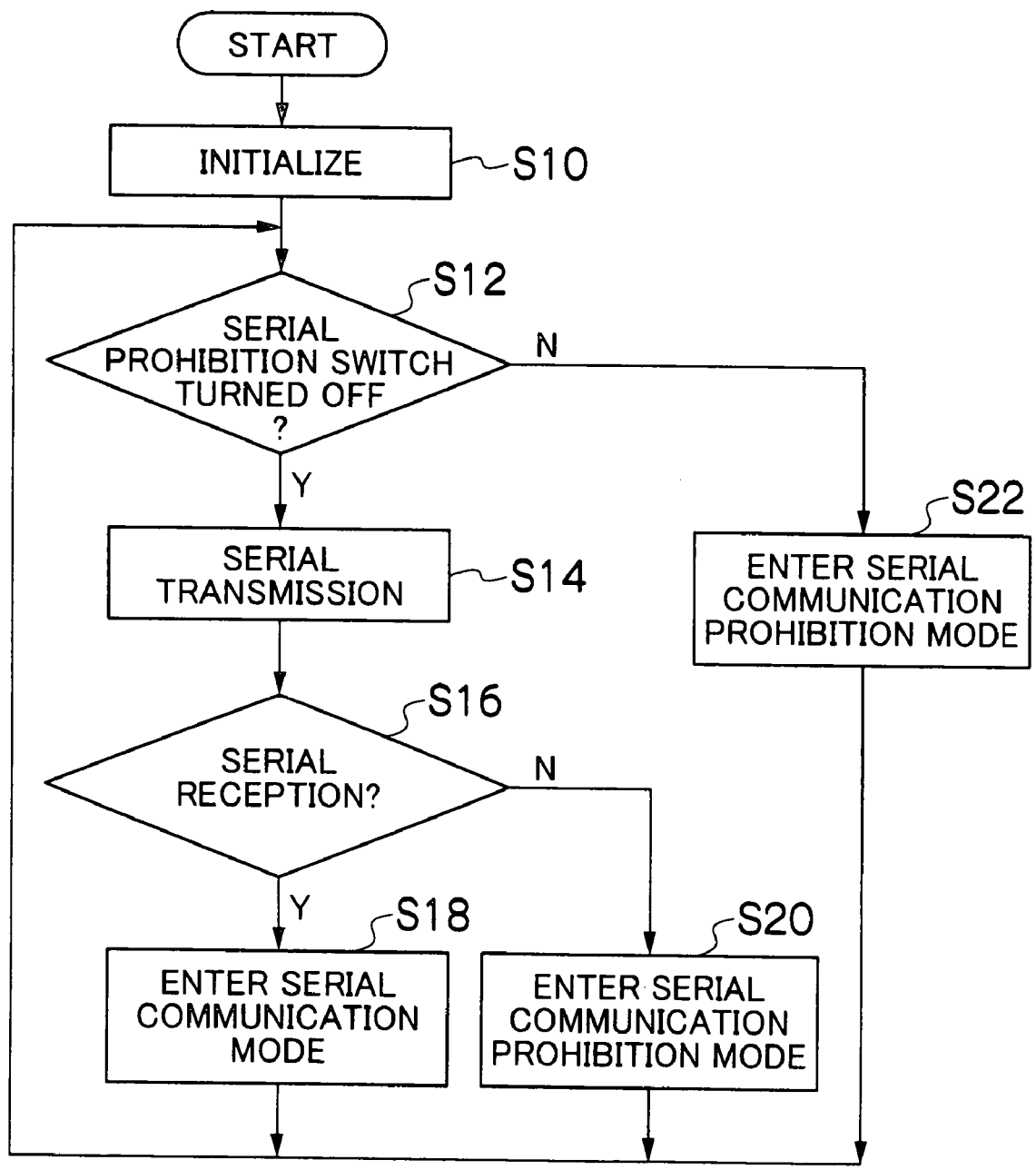
FIG. 2 is a flowchart showing the procedure of setting a communications mode.

The procedure of setting the communications mode by the CPU 14 is described below by referring to the flowchart shown in FIG. 2. When the CPU 14 initializes the system (step S10), it determines whether or not the serial prohibition switch S1 is turned off (step S12). If it determines YES, the serial communication is permitted, and transmits a communications request signal to the camera body 20 in the serial communication (step S14). Then, it determines whether or not a response is received from the camera body 20 (serial reception) (step S16). If it determines YES, the serial communication mode is entered (step S18), and control is returned to step S12. If it determines NO, then the serial communication prohibition mode is entered (step S20), and control is returned to step S12.

If it determines NO in step S12, that is, if it is determined that the serial prohibition switch S1 has been turned on, then the serial communication is prohibited. Therefore, the serial communication prohibition mode is entered (step S22), and control is returned to step S12.

In the embodiment above, the selection device which selects permission of prohibition of the serial communication is a manually operated mechanical switch (serial prohibition switch S1). However, a storage device (for example, EEPROM 30 shown in FIG. 1) capable of electrically storing an ON/OFF state can store the information about the permission or prohibition of the serial communication in advance.

When the serial communication is not performed with the camera body 20 in the case in which the serial communication is prohibited by the serial prohibition switch, the camera body 20 has no serial interface, etc., the throughput required in the CPU 14 can be reduced. Therefore, the clock frequency of the CPU 14 can be reduced for lower processing speed and lower power consumption. Using a processing circuit which requires no CPU operations in performing the above-mentioned processes performed by the CPU 14, the processing speed of the processing circuit can be effectively lower than in the serial communication when the serial communication is suppressed.

What is claimed is:

1. A lens apparatus capable of performing serial and parallel communication with a camera body through a serial and parallel communication interface, comprising:
    a selection device which prohibits the serial communication wherein:
    when the serial communication is prohibited by said selection device, the parallel communication is performed with a camera body.

2. The lens apparatus according to claim 1, wherein:
    when the serial communication is prohibited by said selection device, a processing speed of a processing circuit loaded into said lens apparatus is reduced.

* * * * *